Patented Aug. 8, 1939

2,168,477

UNITED STATES PATENT OFFICE 2,168,477

WATER-SOLUBLE UREA-FORMALDEHYDE-ETHYLENE GLYCOL CONDENSATION PRODUCTS AND PROCESS OF PRODUCING THE SAME

Theodore S. Hodgins, Detroit, and Almon G. Hovey, Pleasant Ridge, Mich.

No Drawing. Application October 8, 1938, Serial No. 234,022

5 Claims. (Cl. 260—70)

This application is a continuation-in-part of Serial No. 203,148, filed April 20, 1938, and comprises a method for improving the water resistance of water-soluble resins of the urea-formaldehyde type, particularly intended for use in aqueous solution for such purposes as film-forming, impregnation of fabrics, etc.

The resins produced according to our invention are formed by reacting urea, formaldehyde and ethylene glycol under special reacting conditions and the product of such reaction we have found differs widely in its characteristics from any previously known in the art, particularly in its superior stability.

Practically all of the water-soluble urea-formaldehyde products which have been described hithertofore are characterized by the relatively high instability in solution with the result that in a comparatively short time white precipitates or gels form, rendering the products useless except for immediate use. By the method which we describe useful urea-formaldehyde products may be prepared and kept stable for long periods of time. The advantages of these products are obvious. For example, standard uniform products can now be made on a large scale and in an economical fashion by a resin manufacturer and shipped to all parts of the world instead of being made on the job in small quantities with varying properties just before using. Furthermore, prior to our invention, if any unexpected delay in the use of the product occurred, as in the case of a shut-down of the factory, the old unstable urea-formaldehyde solutions might spoil before they could be utilized.

We have discovered that the urea-formaldehyde condensation mechanism which takes place in a slightly alkaline medium is desirably stabilized by modification with the formals of ethylene glycol. In a practical way this is accomplished by the simultaneous reaction of 1 mol of urea and 2 mols of formaldehyde to form dimethylol urea and 1 mol of formaldehyde and 1 to 2 mols of ethylene glycol to form the ethylene glycol formals, the dimethylolurea and the formals then reacting to form the stable complexes which are characterized, particularly, by their stability in aqueous solution.

These new stable interaction products obtained by reaction of urea, formaldehyde and of ethylene glycol in the presence of the specific catalysts are not to be confused with the ordinary urea-formaldehyde condensation products which have been formed first and the polyhydric alcohol added as a plasticizer after the resin has been formed. Such products are not only quite unstable alone, but also the addition of the polyhydric alcohol tends to cause precipitation to take place even earlier than if it were not added.

We have found that there is a very definite and limited range of composition which gives resin solutions of stable keeping qualities. When the number of reacting mols of urea, ethylene glycol and of formaldehyde are held within the range of 1, 1–5, and 3 mols respectively, there is a very definite range in which clear, colorless, useful, stable products having improved water resistance are obtained, surrounded by ranges where the water resistance is at a minimum and where a characteristic white precipitate forms with varying degrees of rapidity, rendering the products useless for commercial exploitation.

A few of the points used in locating this range are derived from the following list, which gives some general examples of how the degree of stability varies with change in composition:

*Table I*

| Exp. No. | Composition ||||| Viscosity @ 77° F. initial G. H.+ | Stability ||| Viscosity @ 77° F. final G. H. |
|---|---|---|---|---|---|---|---|---|---|---|
| | Moles urea | Moles formaldehyde | Moles ethylene glycol | Moles NH$_4$OH | | | Two weeks | Four months | Nine months | |
| 1 | 1 | 1 | 1 | 0 | 0.04 | A | WP* | | | |
| 2 | 1 | 1 | 1 | 1.0 | .04 | A | WP | | | |
| 3 | 1 | 1 | 2 | 0 | .04 | A | WP | | | |
| 4 | 1 | 1 | 2 | .33 | .04 | A | WP | | | |
| 5 | 1 | 1 | 2 | .67 | .04 | A | WP | | | |
| 6 | 1 | 1 | 3 | 0 | .04 | A | OK | WP | | |
| 7 | 1 | 1 | 3 | .40 | .04 | A | OK | WP | | |
| 8 | 1 | 1 | 3 | 1.0 | .04 | A | OK | OK | OK | A |
| 9 | 1 | 1 | 3 | 2.0 | .04 | A | OK | OK | OK | A |
| 10 | 1 | 1 | 3 | 3.0 | .04 | A | OK | OK | OK | A |
| 11 | 1 | 1 | 3 | 4.0 | .04 | A | OK | OK | OK | A |
| 12 | 1 | 1 | 3 | 5.0 | .04 | A | OK | WP | | |
| 13 | 1 | 1 | 4 | 0 | .04 | A | OK | OK | OK | A |
| 14 | 1 | 1 | 4 | 1.26 | .04 | A | OK | OK | OK | A |
| 15 | 1 | 1 | 5 | 1.0 | .04 | A | OK | OK | OK | A |

*WP = resin becomes solid, white precipitate.
+ GH = Gardner-Holdt.

We have found that an improvement in (a) water resistance, (b) alcohol resistance can be made by limiting the molecular ratio of ethylene glycol to urea from 1 to 5 and increasing the processing time from 30 minutes as stated in Serial No. 203,148 to 1–3 hours at boiling.

The water resistance of films containing 1–5 mols ethylene glycol per mol urea is excellent when baked 1 hour @ 300° F., and fair when baked for 5 minutes @ 250° F. However, the water resistance of these films is inversely proportional to the amount of ethylene glycol present. When films containing 6 or more mols of ethylene glycol are employed, the water resistance is poor even at the higher baking schedule.

Considering the system: urea, formaldehyde, and ethylene glycol, according to the general formula:—1 mole urea, 3 moles formaldehyde, X moles ethylene glycol, we have the following structural possibilities:

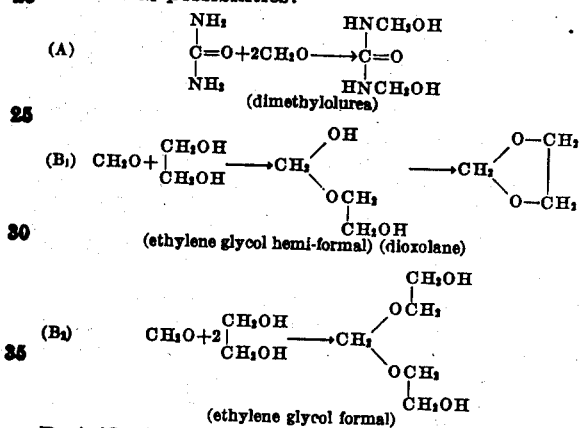

Resinification might be assumed to take place from the intermediates as follows:

1. A+B₁→resin composition
2. A+2B₁→resin composition
3. A+B₂→resin composition
4. A+2B₂→resin composition
5. A+B₁B₂→resin composition The alcohol resistance of these films is shown in the following table:

to bake the final film and a decrease in water resistance of the film is noted.

Example 1

243 parts (3 mols) aqueous formaldehyde, 62 parts (1 mol) ethylene glycol, and 5 parts ammonium hydroxide (26% $NH_3$) are placed in a flask employing a reflux condenser and agitated for 5 minutes. The 60 parts urea (1 mol) are then added and the mixture heated for 60 minutes at boiling. The product is then cooled to room temperature. This product is characterized by its stability and by resistance to water and alcohol when baked at relatively low temperatures, e. g., 30 min. at 250° F.

Example 2

The product of Example 1 is made and 0.004–0.005 mols phosphoric acid per mol of urea is added before cooling to room temperature.

This product will bake to a hard, glassy water and alcohol resistant film even when baked as low as 5 minutes at 190° F. (87.8° C.)

Example 3

Same as Example 1, but employing 5 mols ethylene glycol per mol urea. The product is very similar to Example 1 in behavior.

Example 4

Same as Example 3, but employing 0.004–0.005 mols phosphoric acid per mol urea. This product is similar to Example 2 in behavior.

Example 5

Same as Example 1, but time is 3 hours.

Example 6

Same as Example 2, but time is 3 hours.

While we prefer to employ ammonium hydroxide as a catalyst, we may use other alkaline catalysts which are capable of volatilization. The volatile alkaline catalysts are employed in order that they may be driven off upon the application of heat, so that acid-hardening of the resin may take place by means of the free formic acid (which is present in commercial formaldehyde)

Table II

*Partial immersion in denatured alcohol #1*

| Bake | Condition of film before immersion | Condition of immersed film (2 days) | Condition of film exposed to the alcohol vapors (2 days) | Alcohol "spot test" (a drop under a watch glass) |
|---|---|---|---|---|
| 1 hour at 300° F | Thoroughly converted. Glass hard. Water white and transparent. | Slightly softened, but recovers hardness upon removal from the alcohol. Not whitened. | Still hard. | O. K. |
| 5 minutes at 250° F | Hard and partially converted. Water white and transparent. | Softened, but becomes hard on drying out again. | Softened, but recovers upon removal from vapors. | O. K. |
| Air dry for 3 days (or baking below 200° F. | Soft and unconverted. Water white and transparent. | Opaque white. No good. | Greatly softened, but still almost O. K. upon removal. | Almost O. K. |

Further, we have found that the addition of 0.004–0.005 mols phosphoric acid per mol urea greatly augments the speed of baking and improves the water and alcohol resistance. If larger amounts than 0.004–0.005 mol $H_3PO_4$ per mol urea are employed, the stability of the resulting product is but 24–28 hours at 65° C. or about 7–14 days at room temperatures which is very undesirable for an industrial product. On the other hand, when smaller amounts are employed, much higher temperatures are required remaining after decomposition of ammonium formate which is the salt of a weak acid and weak base.

The process described in the examples is very simple and automatic and does not require elaborate and expensive pH control apparatus.

On account of their transparency, water-white color, heat-hardening characteristics, and non-toxicity, materials prepared according to our examples are very desirable for coating and sizing paper, for preparing molded and laminated articles, for rendering fabrics more greaseproof, more creaseproof and increasing the tensile strength. This is especially true of upholstery cloth for automobiles and furniture, wearing apparel, etc.

We claim—

1. A process of preparing a water-soluble, water-white heat-convertible, resinous product characterized by stability in solution, and when baked being characterized by resistance to water and alcohol; which process comprises simultaneously reacting urea, ethylene glycol and formaldehyde for 1–3 hours at boiling temperature employing a ratio of 1–5 mols ethylene glycol per 1 mol urea and 3 mols aqueous formaldehyde, employing an alkaline catalyst in the initial stage and adding 0.004–0.005 mols phosphoric acid in the final stage.

2. A process for preparing a water-soluble, water-white heat-convertible, resinous product characterized by stability in solution, and when baked being characterized by resistance to water and alcohol; which process comprises simultaneously reacting urea, ethylene glycol and formaldehyde in the proportions of 1 mol urea, 1–5 mols ethylene glycol and 3 mols of formaldehyde.

3. A process of preparing a water-soluble, water-white heat-convertible resinous product characterized by stability in solution, and when baked being characterized by resistance to water and alcohol, which process comprises simultaneously reacting urea, ethylene glycol and formaldehyde in the proportions of 1 mol urea, 1–5 mols ethylene glycol and 3 mols aqueous formaldehyde, in the presence of an alkaline catalyst, and subsequently neutralizing the catalyst.

4. A process of preparing a water-soluble, water-white heat-convertible resinous product characterized by stability in solution, and when baked being characterized by resistance to water and alcohol, which process comprises simultaneously reacting urea, ethylene glycol and formaldehyde for 1–3 hours at boiling temperature, in the proportions of 1 mol of urea, 1–5 mols ethylene glycol and 3 mols aqueous formaldehyde, employing an alkaline catalyst in the initial stage and subsequently neutralizing the catalyst.

5. A water-soluble water-white heat-convertible resinous product produced according to claim 2, and having good water resistance when baked for one hour at 300° F. and fair water resistance when baked for approximately five minutes at 250° F.

THEODORE S. HODGINS.
ALMON G. HOVEY.